Patented Apr. 9, 1940

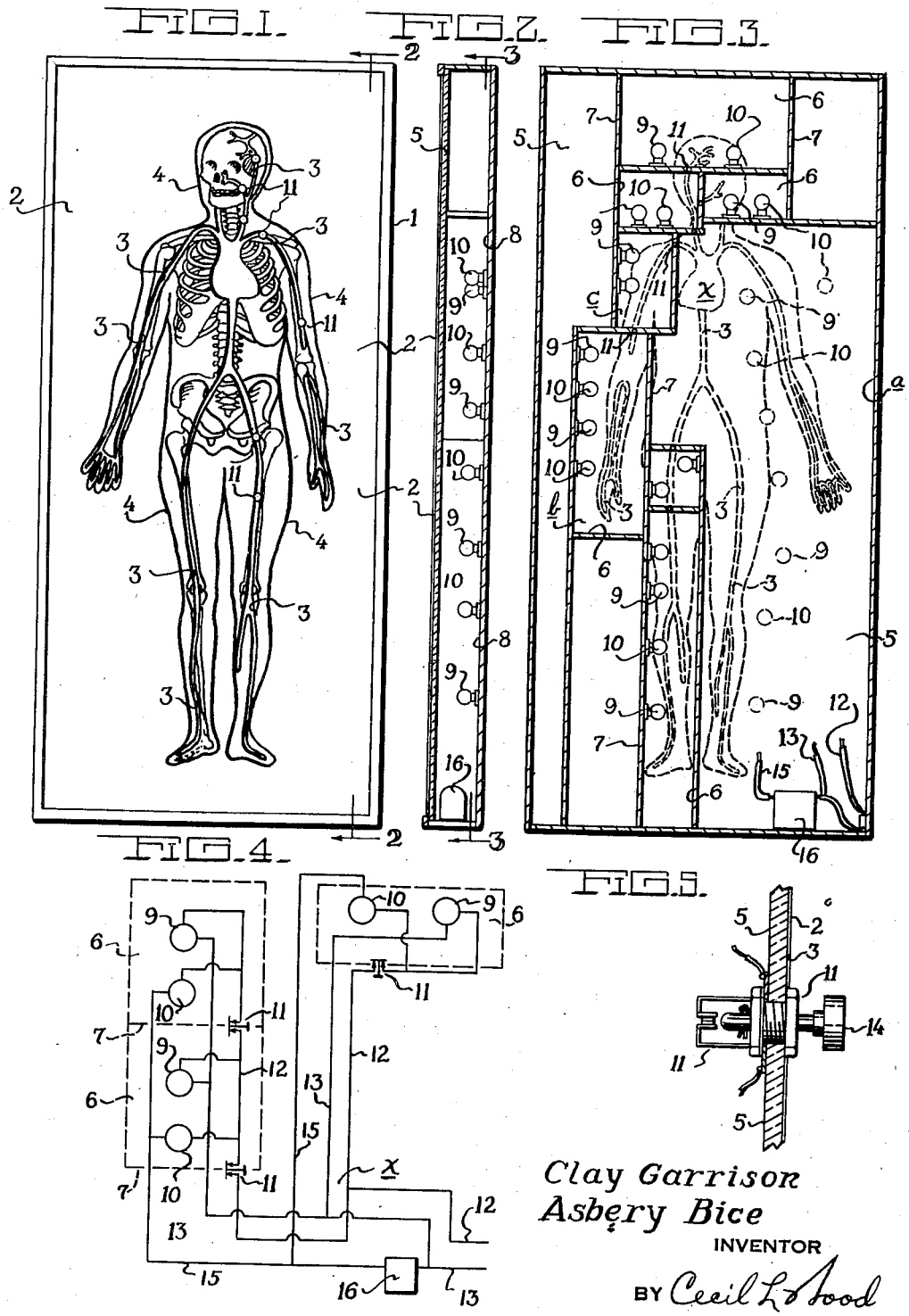

2,196,298

UNITED STATES PATENT OFFICE 2,196,298

INSTRUCTION CHART FOR FIRST AID

Clay Garrison and Asbery Bice, Fort Worth, Tex.

Application July 1, 1938, Serial No. 216,966

8 Claims. (Cl. 35—17)

This invention relates to instruction charts and it has particular reference to an electrically operated first aid chart, the purpose of which is to illustrate the various points on the human body for applying pressure, or tourniquets, to stop the circulation of the blood in the artery of a bleeding extremity.

The principal object of the invention is to provide a chart capable of illustrating, by illuminating and extinguishing lights, the effect of applying pressure by tourniquet to appropriate points, thus visually demonstrating the result of the first aid operation.

Another object of the invention resides in the provision of an electrically operated chart of the character described whereby the pulsation of the heart and the consequent pulsation in the arteries is illustrated.

A further object of the invention is manifest in the provision of an electrical circuit for a chart of the character described whereby a series of incandescent lamps are arranged in conjunction with a series of pulsating lamps, the two circuits cooperating with various switches capable of extinguishing separate series of lights arranged within the several compartments of the instruction chart.

Broadly, the invention seeks to comprehend the provision of an instruction chart for illustrating the various points on the human body to which pressure is applied for the prevention of bleeding, and to visually illustrate the effect of applying tourniquets to these points.

With the foregoing objects as paramount other and lesser objects of the invention will become manifest as the description proceeds taken in connection with the appended drawing wherein:

Figure 1 is a front elevational view of the invention, particularly illustrating the opening in the thorax representing the heart and the slots that represent the arteries extending from the heart to the several parts of the illustrated figure.

Figure 2 is a cross sectional view taken on lines 2—2 of Figure 1 illustrating the side dimension of the device in its preferred form as well as the relative positions of some of the internal parts.

Figure 3 is a vertical sectional view taken on lines 3—3 of Figure 2 illustrating the various compartments arranged within the frame and the positions of the operating parts.

Figure 4 is a diagrammatical illustration of part of the wiring circuit, but including the necessary elements for the complete operation of the sections, or compartments, the latter being illustrated in dotted lines, and Figure 5 is an elevational view of one of the push button switches employed in the invention shown mounted in a fragment of the glass plate.

Accordingly, the invention is comprised of a box-like frame 1 having an opaque front panel 2 in which there is provided an opening in the sternum representing the heart and slots 3 designed to outline the relative positions of the arteries and the heart as determined with reference to a drawing 4 of the human body illustrated on the front of the said panel, as particularly illustrated in Figure 1. It is not intended, however, that the illustrations on the chart be entirely anatomically correct but simply to illustrate the general location and arrangement of the heart and the vascular system of the human body.

In its preferred construction, the opaque panel 2 is of heavy paper or thin wood and is glued or otherwise fixed to a translucent supporting glass plate 5 that is of the same size of the said panel, the glass being red in color. Obviously, the panel 2 can be made of a stout material, such as ply wood, and the colored translucent material may be of Cellophane or the like without departing from the intent of the invention.

Within the frame 1 there are positioned various compartments 6 that are formed by partitions 7 laterally projecting from the back 8 of the said frame to the back of the glass plate 5 as illustrated in Figures 2 and 3, the purpose of which is to inclose the steadily burning lights 9 as well as the intermittently flashing lights 10, the latter representing the pulsations of the heart each compartment confining lights behind sections of the slots 3 and the opening.

Push button switches 11 of the two point make type, as illustrated in Figure 5, are mounted in the glass plate 5 and within the slots 3 at the tourniquet points and at the divisions 7 between the compartments 6.

The previously referred to lamps 9 are connected in parallel to a circuit separate from that connecting the flashing or intermittent lamps 10, although both circuits are energized by the lead lines 12 and 13. The lead 12 might properly be termed a ground line since it forms a part of both circuits and has control of the two jointly through the switch buttons 11.

It is preferred that the wiring of the chart be arranged from the source of current so that the latter may flow through the circuit similar to the circulation of the blood, that is, the wires branch at X, a point positioned behind the heart in the Diagram 4. The conduits 12 and 13 are passed from this point in directions of the extremities illustrated and are connected to the steadily burning lights in the various compartments 6 and remain energized by reason of the construction of the switches 11 since a contact is made until separated by pressure on the button 14. The circuit for the pulsating lamps is provided with a conduit or a lead 15 that passes through, and connects in series, a motor driven switch contact maker 16, often referred to as a flasher, thence connects the lights 10 in parallel with the previously referred to lead line 13. The push buttons 11 are all connected in series in the lead line 12, and with this arrangement it can be seen that the switch nearest the division point X will extinguish all lights positioned beyond the said switch and the said division.

The lights are so arranged in each compartment that there is a flashing light and a steadily burning light while that portion of the two circuits are energized. Since it is not necessary to illustrate the effect on but one side of the chart, all extremities need not be operatively illustrated. Consequently the large compartment $a$ that has no switches connects the slots 3 with the arteries of one side of the Diagram 4 and includes the heart and the lights in which remain energized as long as the circuits are connected to their source.

In operation the switches in their normal positions remain closed and the lights 9 burn steadily within the various compartments 6 and illuminate the slots 3 through the glass plate 5. At the same time the flashing or intermittent lights 10 perform a similar operation but create a pulsating effect to the eye as seen from the front of the chart. If it is desired to illustrate the effect of applying pressure to an extremity, for example a forearm, the corresponding push buttons are opened and the lights below the said button and in the compartment $b$ are extinguished, that is, both of the sets of lights 9 and 10.

To illustrate the stopping of circulation at the tourniquet point of the shoulder, effecting the entire arm, the corresponding switch 11 is opened and the lights in the compartments $b$ and $c$ are both extinguished. The same arrangement is extended to the compartments for extinguishing the lights in the leg, neck, and parts of the head.

Obviously, the structure shown is capable of certain changes from time to time by those skilled in the art, but such changes and modifications as may be within the intent of the invention may also be considered as falling within the scope of the appended claims.

What is claimed is:

1. An instruction chart for illustrating points on the human body to which pressure is applied for the prevention of bleeding comprising a frame, a panel positioned at the front of the said frame having an outline of a figure thereon representing the human form, a common point on the said panel representing the heart, separate compartments arranged in the said frame behind the said panel, slots designating parts of the human anatomy arranged through the said panel over the said compartments, colored translucent material positioned over the said slots behind the said panel, electrical circuits extending from the said common point through the said compartments and within the said frame lights arranged in the said circuit in each of the said compartments and switches adapted to interrupt the said circuit extinguishing the said lights in simulation of the application of a tourniquet to any of the several representations of blood streams.

2. An instruction chart for illustrating tourniquet and similar pressure points comprising a box-like frame and a panel at the front thereof, the representation of a human form in the said panel, a common point on the said panel representing the heart of the said form, a series of lights arranged within the said frame behind the said panel, an electrical circuit connecting the said lights, compartments separating the said lights into sections and switches controlling the lights in one or more of the said sections interrupting the said circuit to extinguish the said lights and adapted to simulate the application of a tourniquet.

3. An instruction chart for illustrating the tourniquet and similar pressure points on the human body comprising a frame and a front panel, the representation of a human form on the said panel, lights arranged within the said frame behind the said panel and compartments separating several of the said lights, means intermittently energizing a portion of the said lights, openings designating arteries and the heart of the human body arranged through the said panel and illuminated by the said lights, translucent material positioned between the said openings and the said lights and means arranged at points intermediate the said compartments for manually extinguishing the said lights beyond the said points and the source of energy adapted to simulate the application of a tourniquet.

4. In an instruction chart having a frame and a front panel, a figure simulating a human form on the said panel, separate electrical circuits diverging from a common point representing the heart of the said figure, lights connected in the said circuits, compartments behind the said panel each enclosing lights connected in each circuit, slots in the said panel and over the said compartments representing arteries, and switches in the said circuits for extinguishing the lights beyond the said switches to simulate the application of tourniquets shutting off the blood stream.

5. In an instruction chart having a frame and a front panel, a figure simulating a human form on the said panel, a pair of electrical circuits diverging from a common point representing the heart of the said figure, lights connected in parallel within said circuits, compartments arranged behind the said panel and embracing the said lights, each of the said compartments enclosing lights of each circuit, slots in the said panel extending from the said common point to the several parts of the said figure representing limbs and vital centers arranged over the said compartments, switches between the said compartments and operatively connected to each of the said circuits whereby the lights beyond each switch, relative to the said common point, may be extinguished in simulation of the application of a tourniquet.

6. In an instruction chart for first aid having a frame and a front panel arranged over the said frame, a figure simulating a human form on the said panel, an arrangement of compartments of the said frame behind the said panel, an opening in the said panel representing the heart of the said figure and slots extending from the said opening to the several parts of the said figure representing blood vessels, the said opening and the said slots covered with a translucent material, an electrical circuit connecting all of the said lights in series and manually operated switches arranged at points in the said circuit adapted to interrupt the current to certain of the said lights simulating the application of tourniquets to certain blood vessels interrupting the flow of blood therethrough.

7. In a first aid instruction chart, a frame having a front panel, the representation of a human figure arranged on the said panel, an opening in the said panel representing the heart of the said figure having slots extending therefrom to the limbs and other vital parts of the said figure, an arrangement of compartments in the said frame behind the said panel, lamps arranged in each of the said compartments adapted to illuminate the said opening and the said slots independently and collectively, an electrical circuit connecting all of the said lamps and switches arranged along the said slots representing points of pressure for interrupting the flow of blood through the blood vessels represented by the said slots whereby the lamps illuminating the said slots can be extinguished beyond the said switch with respect to the said opening representing the heart.

8. In an instruction chart having a frame and a front panel, the representation of a human form outlined on the said panel, a multiplicity of closed compartments in the said frame behind the said panel, slots in the said panel extending from a position representing the heart over the said outline representing arteries and blood streams and opening into the said compartments, an electrical circuit arranged through the said frame, lamps connected in the said circuit and positioned in each of the said compartments and switches connected in the said circuit at points along the said slots adapted to interrupt the current in a manner simulating the application of a tourniquet.

CLAY GARRISON.
ASBERY BICE.